(No Model.)

H. C. SWAN.
VEHICLE SPRING.

No. 372,717. Patented Nov. 8, 1887.

Witnesses.
A. Ruppert.
Daniel Scott

Inventor:
Henry C. Swan,
Per
Thomas P. Simpson,
Atty.

UNITED STATES PATENT OFFICE.

HENRY C. SWAN, OF OSHKOSH, WISCONSIN.

VEHICLE-SPRING.

SPECIFICATION forming part of Letters Patent No. 372,717, dated November 8, 1887.

Application filed June 27, 1887. Serial No. 242,624. (No model.)

*To all whom it may concern:*

Be it known that I, HENRY C. SWAN, a citizen of the United States, residing at Oshkosh, in the county of Winnebago and State of Wisconsin, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to overcome the tendency of equalized vehicle-springs to give sudden jars to the occupant of the vehicle and that of unequalized springs to allow the body thereof to sway from side to side.

Figure 1:
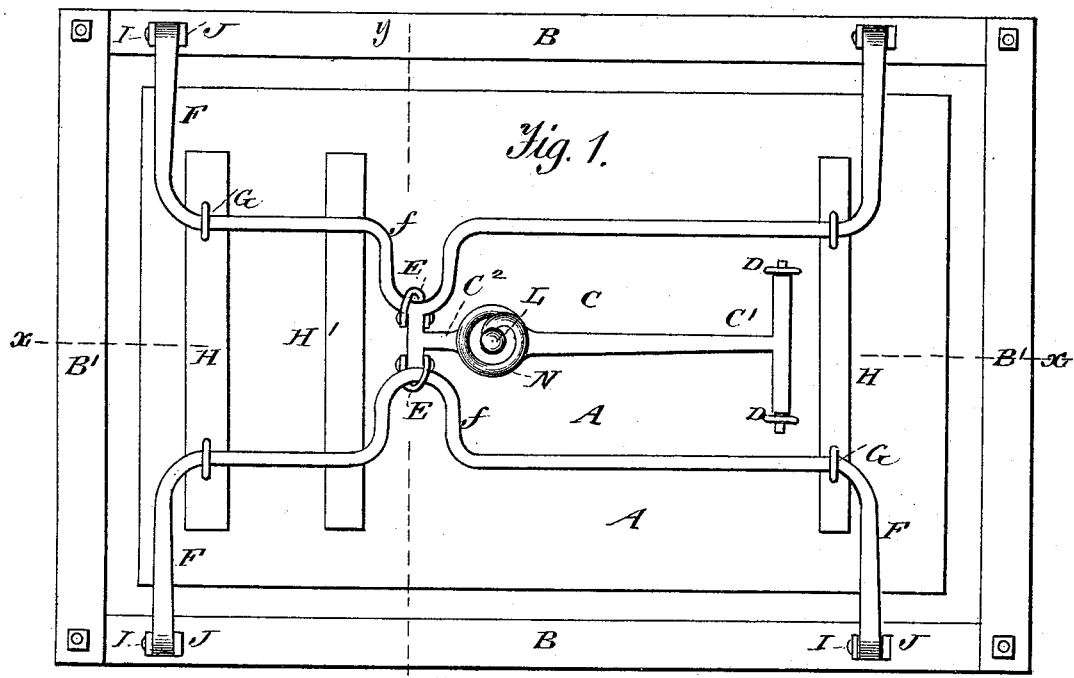
Figure 2:
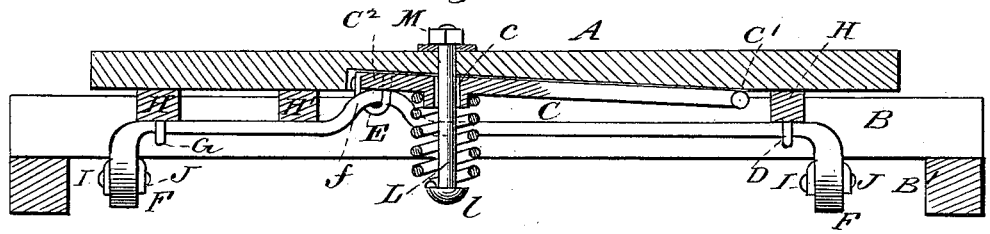
Figure 3:
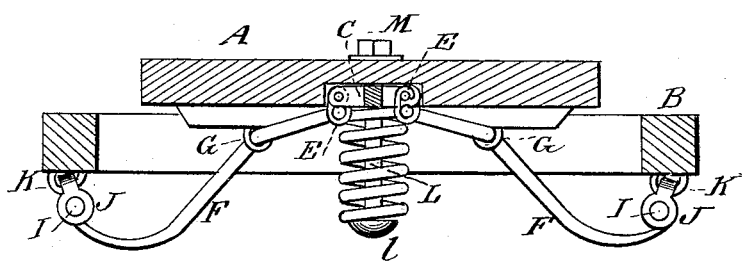

Figure 1 of the drawings is a bottom plan view showing my invention applied; Fig. 2, a longitudinal median section thereof on line $xx$, and Fig. 3 a transverse section on line $yy$ of Fig. 1.

In the drawings, A represents the bed or bottom of a vehicle-body, and B B the side bars, connected by the end bars, B′ B′.

C is an equalizer having the T-arm C′ end-journaled in the bearings D D on the bottom A, while the other end is provided with a T-arm, C², connected at the ends by shackles E E with the cranks $ff$ on the opposite spring-bars F F. The latter are held in bearings G to the cross-bars H H, made fast to the vehicle-bottom. Parallel to the bars H H is arranged another fast cross-bar, H′, by which the bottom A obtains a third bearing on the spring-bars F F, whose ends turn on the pivots I in the U-bearings J. The latter play in the eyes K, which are made fast to the side bars, B B.

Between the arms C′ C², and nearest to the latter, the equalizing-bar C has a hole, $c$, through which passes an end-threaded screw-bolt, L, extending up through the bottom or bed A and receiving a nut, M. Between the equalizer-bar and the bolt-head $l$, I arrange the coiled spring N, to distribute the weight equally to the two spring-bars F F. In these spring-bars the elasticity is sufficient to prevent sudden jars from being experienced by the occupant of the vehicle, while the addition thereto of the elasticity from the spring N prevents the laterally-swaying motion.

I find that in practice it is a matter of great importance to be able to adjust the tension of the spring N by means of the bolt and nut so that the vehicle may carry a greater or less load at the same depression of the bed and body of the vehicle.

Having thus described all that is necessary to a full understanding of my invention, what I claim as new, and desire to protect by Letters Patent, is—

The combination, with a vehicle-bed, of the pivoted equalizing-lever C, having the terminal cross-arms C′ C² and the hole $c$, the coil-spring N, secured by a nutted bolt to the bed and bar C, and the two spring-bars F F, pivoted to side bars, B B, and to cross bars on the bed, the whole adapted to operate as described.

In testimony whereof I affix my signature in presence of two witnesses.

HENRY C. SWAN.

Witnesses:
GEORGE R. FRASER,
WILL R. BROWNE.